United States Patent
Araki et al.

(10) Patent No.: US 9,081,146 B2
(45) Date of Patent: Jul. 14, 2015

(54) POLARIZING MEMBRANE AND POLARIZING FILM

(75) Inventors: Tatsuya Araki, Ibaraki (JP); Seiji Kondo, Ibaraki (JP); Yutaka Fujita, Ibaraki (JP); Atsushi Muraoka, Ibaraki (JP); Hiroaki Sawada, Ibaraki (JP)

(73) Assignee: NITTO DENKO CORPORATION, Ibaraki-shi (JP)

( * ) Notice: Subject to any disclaimer, the term of this patent is extended or adjusted under 35 U.S.C. 154(b) by 432 days.

(21) Appl. No.: 13/421,926

(22) Filed: Mar. 16, 2012

(65) Prior Publication Data

US 2012/0243089 A1    Sep. 27, 2012

(30) Foreign Application Priority Data

Mar. 23, 2011   (JP) .................................. 2011-063850

(51) Int. Cl.

| | |
|---|---|
| *G02B 5/30* | (2006.01) |
| *B29C 39/18* | (2006.01) |
| *B29C 41/28* | (2006.01) |
| *B29C 55/06* | (2006.01) |
| *B29C 55/08* | (2006.01) |
| *B29K 29/00* | (2006.01) |

(52) U.S. Cl.

CPC .............. *G02B 5/3033* (2013.01); *B29C 39/18* (2013.01); *B29C 41/28* (2013.01); *B29C 55/06* (2013.01); *B29C 55/08* (2013.01); *B29K 2029/04* (2013.01); *B29K 2995/0034* (2013.01)

(58) Field of Classification Search

CPC .... G02B 5/3033; G02B 5/305; G02B 5/3083; G02B 5/30; G02B 5/3025; G02F 1/133528
USPC ........................... 359/487.01, 487.02; 349/96
See application file for complete search history.

(56) References Cited

U.S. PATENT DOCUMENTS

| | | | |
|---|---|---|---|
| 8,279,378 | B2 | 10/2012 | Futamura et al. |
| 8,587,756 | B2 | 11/2013 | Sabae et al. |
| 2006/0210803 | A1 | 9/2006 | Ishibashi et al. |
| 2009/0176037 | A1 | 7/2009 | Otoshi et al. |
| 2009/0257012 | A1 | 10/2009 | Sabae et al. |
| 2010/0073608 | A1 | 3/2010 | Futamura et al. |
| 2010/0277675 | A1* | 11/2010 | Higashi et al. .................. 349/96 |
| 2010/0282398 | A1 | 11/2010 | Ishibashi et al. |

(Continued)

FOREIGN PATENT DOCUMENTS

| | | |
|---|---|---|
| CN | 101889222 A | 11/2010 |
| JP | 10-288709 A | 10/1998 |
| JP | 11-049878 A | 2/1999 |

(Continued)

OTHER PUBLICATIONS

Japanese Office Action dated May 15, 2013, issued in corresponding Japanese Patent Application No. 2013-036883, w/ English translation.

(Continued)

*Primary Examiner* — Frank Font
(74) *Attorney, Agent, or Firm* — Westerman, Hattori, Daniels & Adrian, LLP

(57) ABSTRACT

A polarizing membrane according to an embodiment of the present invention includes a polyvinyl alcohol-based resin membrane containing a dichromatic substance. The polyvinyl alcohol-based resin membrane has an Nz coefficient of 1.10 or more and 1.50 or less.

9 Claims, 2 Drawing Sheets

(56) References Cited

U.S. PATENT DOCUMENTS

2011/0315306 A1    12/2011    Goto et al.
2012/0140152 A1*   6/2012    Sakai .............................. 349/96

FOREIGN PATENT DOCUMENTS

| | | |
|---|---|---|
| JP | 2001-305347 A | 10/2001 |
| JP | 2002-028971 A | 1/2002 |
| JP | 2002-60505 A | 2/2002 |
| JP | 2003-43257 A | 2/2003 |
| JP | 2005-92187 A | 4/2005 |
| JP | 2008-015000 A | 1/2008 |
| JP | 2008-216979 A | 9/2008 |
| JP | 2008-310262 A | 12/2008 |
| TW | 201003153 A | 1/2010 |
| TW | 201022293 A | 6/2010 |
| WO | 2010/100917 A1 | 9/2010 |

OTHER PUBLICATIONS

Extended European Search Report dated Jul. 3, 2012, issued in corresponding European Patent Application No. 12159025.1-1234 (7 pages).

Japanese Office Action dated Sep. 12, 2012, issued in corresponding Japanese Patent Application No. 2011-063850, with English translation (9 pages).

Japanese Office Action dated Oct. 2, 2013, issued in corresponding Japanese Patent Application No. 2013-036883, w/ English translation.

Office Action dated May 28, 2014, issued in corresponding Taiwanese Patent Application No. 101109479, with English Traslation (13 pages).

Office Action dated Feb. 25, 2015, issued in corresponding Chinese Patent Application No. 201210080607.6, with English translation (13 pages).

* cited by examiner

POLARIZING MEMBRANE AND POLARIZING FILM

This application claims priority under 35 U.S.C. Section 119 to Japanese Patent Application No. 2011-063850 filed on Mar. 23, 2011, which are herein incorporated by references.

BACKGROUND OF THE INVENTION

1. Field of the Invention

The present invention relates to a polarizing membrane and a polarizing film.

2. Description of the Related Art

It is absolutely necessary to place polarizing films on both sides of a liquid crystal cell in a liquid crystal display apparatus as a representative image display apparatus as a result of its image formation mode. The polarizing films are each typically formed by laminating protective films on both surfaces of a polarizing membrane. The polarizing membrane is representatively produced by uniaxially stretching a polyvinyl alcohol-based resin film and dyeing the stretched film (see, for example, Japanese Patent Application Laid-open No. Hei 10-288709 and Japanese Patent Application Laid-open No. Hei 11-49878). However, each of the polarizing films involves such problems in terms of durability as described below. The polarizing film is susceptible to changes in temperature and humidity. In particular, a crack occurs owing to an abrupt temperature change.

SUMMARY OF THE INVENTION

The present invention has been made to solve the conventional problems, and a main object of the present invention is to provide a polarizing film that brings together excellent optical characteristics and excellent durability.

According to one aspect of the present invention, a polarizing membrane is provided. The polarizing membrane includes a polyvinyl alcohol-based resin membrane containing a dichromatic substance. The polyvinyl alcohol-based resin membrane has an Nz coefficient of 1.10 or more and 1.50 or less.

In one embodiment of the present invention, the polarizing membrane has a polarization degree at a single axis transmittance of 40% of 99.9% or more.

In another embodiment of the present invention, the polarizing membrane has a thickness of less than 10 μm.

In still another embodiment of the present invention, the polarizing membrane has a thickness of 1 μm or more.

In still another embodiment of the present invention, the polarizing membrane is obtained by shrinking one of a polyvinyl alcohol-based resin film and a polyvinyl alcohol-based resin layer formed on a thermoplastic resin substrate in a first direction, and stretching one of the film and the layer in a second direction.

In still another embodiment of the present invention, a shrinkage percentage in the first direction is 5% or more and 40% or less.

In still another embodiment of the present invention, a stretching ratio in the second direction is 4.0 times or more.

According to another aspect of the present invention, a polarizing film is provided. The polarizing film includes the polarizing membrane and a protective film laminated on at least one side of the polarizing membrane.

The polarizing membrane of the present invention is constructed of a polyvinyl alcohol-based resin membrane whose Nz coefficient falls within a specific range, and its alignment property (the alignment state of a polyvinyl alcohol-based resin molecule) is controlled. Accordingly, there can be provided a polarizing film that brings together excellent optical characteristics and excellent durability. Specifically, the use of the polarizing membrane of the present invention can provide such a polarizing film that the occurrence of a crack due to an abrupt temperature change is suppressed while excellent optical characteristics are retained.

DETAILED DESCRIPTION OF THE PREFERRED EMBODIMENTS

Figure 1:
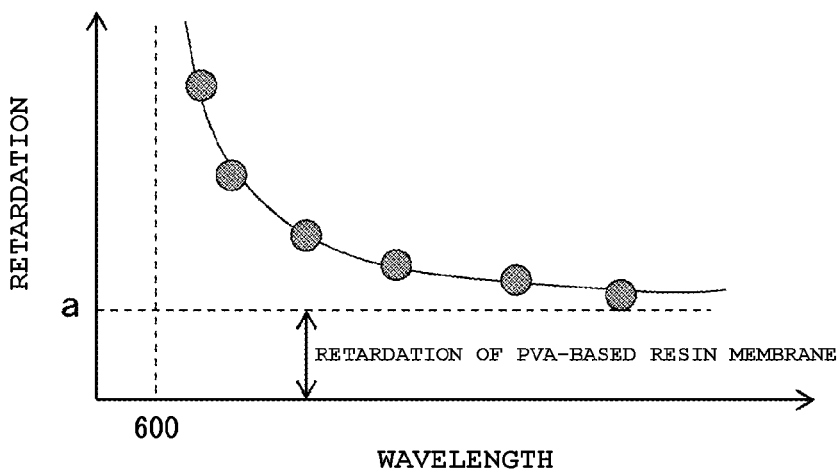
FIG. 1 is a graph illustrating a method of calculating the Nz coefficient of a PVA-based resin membrane.

Hereinafter, preferred embodiments of the present invention are described. However, the present invention is not limited to these embodiments.

(Definitions of Terms and Symbols)

The definitions of terms and symbols used herein are as follows.

(1) Refractive Indices ($nx$, $ny$, and $nz$)

A symbol $nx$ represents a refractive index in a direction in which an in-plane refractive index is maximum (that is, slow axis direction), $ny$ represents a refractive index in a direction perpendicular to the slow axis in the plane, and $nz$ represents a refractive index in a thickness direction.

(2) In-plane Retardation (Re)

An in-plane retardation (Re) is obtained by the expression: $Re=(nx-ny) \times d$, where d (nm) represents the thickness of the membrane (layer).

(3) Thickness Direction Retardation (Rth)

A thickness direction retardation (Rth) is obtained by the expression: $Rth=\{(nx+ny)/2-nz\} \times d$, where d (nm) represents the thickness of the membrane (layer).

(4) Nz Coefficient

An Nz coefficient is obtained by the expression: $Nz=(nx-nz)/(nx-ny)$.

A. Polarizing Membrane

A polarizing membrane of the present invention is constructed of a polyvinyl alcohol-based resin (hereinafter referred to as "PVA-based resin") membrane containing a dichromatic substance.

Examples of the dichromatic substance include iodine and an organic dye. Those substances can be used alone or in combination. Of those, iodine is preferably used.

Any appropriate resin can be used as a PVA-based resin for forming the PVA-based resin membrane. Examples thereof include polyvinyl alcohol and an ethylene-vinyl alcohol copolymer. The polyvinyl alcohol is obtained by saponifying polyvinyl acetate. The ethylene-vinyl alcohol copolymer is obtained by saponifying an ethylene-vinyl acetate copolymer. The PVA-based resin has a saponification degree of typically 85 mol % to 100 mol %, preferably 95.0 mol % to 99.95 mol %, more preferably 99.0 mol % to 99.93 mol %. The saponification degree can be determined in conformity with JIS K 6726-1994. The use of the PVA-based resin having such saponification degree can provide a polarizing membrane excellent in durability. When the saponification degree is excessively high, the resin may gel.

The average polymerization degree of the PVA-based resin can be appropriately selected depending on purposes. The average polymerization degree is typically 1,000 to 10,000, preferably 1,200 to 4,500, more preferably 1,500 to 4,300. It should be noted that the average polymerization degree can be determined in conformity with JIS K 6726-1994.

The Nz coefficient of the PVA-based resin membrane is preferably 1.10 or more. Meanwhile, the Nz coefficient of the PVA-based resin membrane is preferably 1.50 or less, more preferably 1.40 or less. Setting the Nz coefficient within such range can provide a polarizing film having excellent durability while maintaining the optical characteristics of the polarizing membrane. When the Nz coefficient is less than 1.10, the alignment property (uniaxiality) of the PVA-based resin membrane becomes so high that sufficient durability may not be obtained. When the Nz coefficient exceeds 1.50, display quality requested of, for example, a liquid crystal television may not be obtained.

The Nz coefficient of the PVA-based resin membrane is an indicator of the alignment property of the molecular chain of the PVA-based resin membrane, and is calculated from the retardation of the PVA-based resin membrane. The retardation (a-value) of the PVA-based resin membrane is determined by: measuring the retardations of the polarizing membrane while changing a measurement wavelength ($\lambda$); plotting the retardations of the polarizing membrane against measurement wavelengths indicated by an axis of abscissa as illustrated in FIG. 1; creating an approximate curve on the basis of the following equation; and calculating an asymptote (a-value) from the approximate curve. Here, the retardations of the polarizing membrane are measured from its front and oblique directions.

$$R=a+b/(\lambda^2-600^2)$$

In the equation, R represents the retardation of the polarizing membrane, a represents the retardation of the PVA-based resin membrane, and b represents a constant.

The polarizing membrane preferably shows absorption dichroism at any wavelength in the wavelength range of 380 nm to 780 nm. The polarizing membrane has a polarization degree at a single axis transmittance of 40% of preferably 99.9% or more, more preferably 99.93% or more, still more preferably 99.95% or more.

The thickness of the polarizing membrane can be set to any appropriate value. The thickness is preferably 30 μm or less, more preferably 25 μm or less, still more preferably 20 μm or less, particularly preferably less than 10 μm. The polarizing membrane typically has a larger shrinkage force than that of a protective film, and a stress arises at an interface between the polarizing membrane and the protective film. Thus, a crack can occur. The shrinkage force of the polarizing membrane depends on its thickness, and the shrinkage force reduces as the thickness reduces. A commercially available polarizing membrane typically has a relatively large thickness of about 20 μm to 25 μm, and hence its durability is not sufficient. According to the present invention, however, a polarizing membrane excellent in durability can be obtained. Further, setting the thickness to less than 10 μm can markedly improve the durability. Meanwhile, the thickness is preferably 1 μm or more. When the thickness is less than 1 μm, sufficient optical characteristics may not be obtained.

The polarizing membrane of the present invention can be used in any appropriate form. The polarizing membrane is representatively used (as a polarizing film) by laminating a protective film on at least one side thereof. A formation material for the protective film is, for example, a (meth)acrylic resin, a cellulose-based resin such as diacetylcellulose or triacetylcellulose, a cycloolefin-based resin, an olefin-based resin such as polypropylene, an ester-based resin such as a polyethylene terephthalate-based resin, a polyamide-based resin, a polycarbonate-based resin, or a copolymer resin thereof. It should be noted that a thermoplastic resin substrate to be described later may be used as the protective film without being treated.

The protective film preferably has a thickness of 20 μm to 100 μm. The protective film may be laminated on the polarizing membrane through an adhesion layer (specifically an adhesive layer or a pressure-sensitive adhesive layer), or may be laminated so as to be in close contact with the polarizing membrane (without through any adhesion layer). The adhesive layer is formed of any appropriate adhesive. The adhesive is, for example, a vinyl alcohol-based adhesive.

B. Method of Producing Polarizing Membrane

The polarizing membrane of the present invention is produced by any appropriate method as long as the Nz coefficient can be satisfied. The polarizing membrane is representatively produced by appropriately subjecting the PVA-based resin membrane to a treatment such as stretching or dyeing.

B-1. PVA-Based Resin Membrane

The PVA-based resin membrane is representatively formed in a lengthy fashion. The PVA-based resin membrane preferably has a thickness of less than 100 μm. For example, the PVA-based resin membrane maybe a PVA-based resin film, or maybe a PVA-based resin layer formed on a thermoplastic resin substrate. The PVA-based resin film is preferably used when a polarizing membrane having a thickness of 10 μm or more is produced. The PVA-based resin film preferably has a thickness of 50 μm to 80 μm. A laminate of the thermoplastic resin substrate and the PVA-based resin layer is preferably used when a polarizing membrane having a thickness of less than 10 μm is produced. The PVA-based resin layer preferably has a thickness of 5 μm to 20 μm. Even when the layer has such small thickness, the layer can be favorably stretched through the use of the thermoplastic resin substrate.

The thickness (before the stretching) of the thermoplastic resin substrate for constructing the laminate is preferably 50 μm to 250 μm. When the thickness is less than 50 μm, the substrate may rupture at the time of the stretching. In addition, the thickness becomes so small after the stretching that the laminate may become difficult to convey. When the thickness exceeds 250 μm, an excessive load may be applied to a stretching machine. In addition, the conveyance may become difficult.

A formation material for the thermoplastic resin substrate is, for example, an ester-based resin such as a polyethylene terephthalate-based resin, a cycloolefin-based resin, an olefin-based resin such as polypropylene, a polyamide-based resin, a polycarbonate-based resin, or a copolymer resin thereof. Of those, a cycloolefin-based resin (such as a norbornene-based resin) or an amorphous polyethylene terephthalate-based resin is preferred. Specific examples of the amorphous polyethylene terephthalate-based resin include a copolymer further containing isophthalic acid as a dicarboxylic acid and a copolymer further containing cyclohexane dimethanol as a glycol.

The thermoplastic resin substrate preferably has a glass transition temperature (Tg) of 170° C. or less. The use of such thermoplastic resin substrate enables the stretching of the laminate at such a temperature that the crystallization of the PVA-based resin does not rapidly progress, and can suppress a trouble due to the crystallization (such as the inhibition of the alignment of the PVA-based resin layer by the stretching). It should be noted that the glass transition temperature (Tg) is a value determined in conformity with JIS K 7121.

Any appropriate method can be adopted as a method of forming the PVA-based resin layer. A preferred method involves applying an application liquid containing the PVA-based resin onto the thermoplastic resin substrate and drying the liquid to form the PVA-based resin layer. It should be noted that the PVA-based resin layer thus obtained may be used not only as a laminate (while being formed on the thermoplastic resin substrate) but also as a PVA-based resin film after being released from the thermoplastic resin substrate.

The application liquid is representatively a solution prepared by dissolving the PVA-based resin in a solvent. Examples of the solvent include water, dimethyl sulfoxide, dimethylformamide, dimethylacetamide, N-methylpyrrolidone, various glycols, polyhydric alcohols such as trimethylolpropane, and amines such as ethylenediamine and diethylenetriamine. Those solvents can be used alone or in combination. Of those, water is preferred. The solution preferably has a PVA-based resin concentration of 3 parts by weight to 20 parts by weight with respect to 100 parts by weight of the solvent. Such resin concentration enables the formation of a uniform coating film that closely contacts the thermoplastic resin substrate.

The application liquid may be compounded with an additive. Examples of the additive include a plasticizer and a surfactant. Examples of the plasticizer include polyhydric alcohols such as ethylene glycol and glycerin. Examples of the surfactant include nonionic surfactants. Those additives can each be used for the purpose of additionally improving the uniformity, dyeing property, or stretchability of the PVA-based resin layer to be obtained.

Any appropriate method can be adopted as an application method for the application liquid. Examples thereof include a roll coating method, a spin coating method, a wire bar coating method, a dip coating method, a die coating method, a curtain coating method, a spray coating method, and a knife coating method (comma coating method or the like).

The drying temperature is preferably equal to or less than the glass transition temperature (Tg) of the thermoplastic resin substrate, and is more preferably equal to or less than Tg-20° C. Performing the drying at such temperature can prevent the thermoplastic resin substrate from deforming before the formation of the PVA-based resin layer, and hence can prevent the deterioration of the alignment property of the PVA-based resin layer to be obtained.

B-2. Stretching

Figure 3:
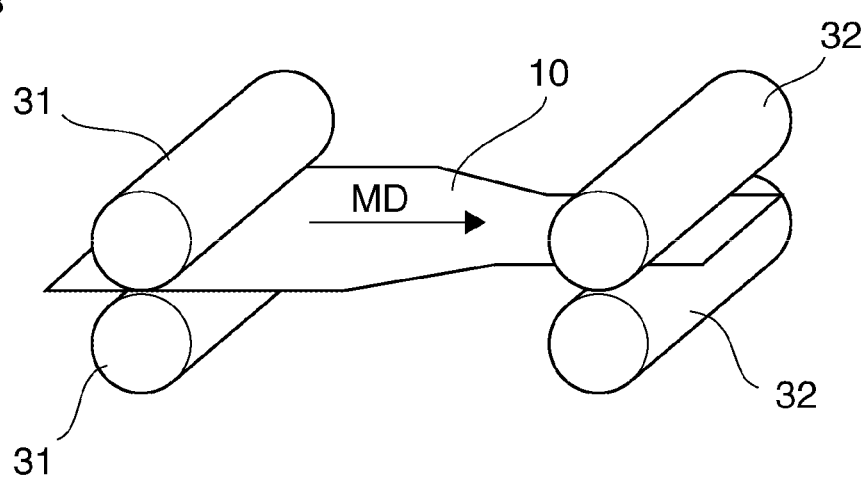
FIG. 3 is a schematic view illustrating a specific example of the method of producing a polarizing membrane.

The Nz coefficient can be controlled by appropriately selecting stretching conditions such as a stretching method, a stretching ratio, and a stretching temperature. Examples of the stretching method include fixed-end stretching involving using a tenter stretching machine, free-end stretching involving using rolls having different peripheral speeds, biaxial stretching involving using a simultaneous biaxial stretching machine, and sequential biaxial stretching. Those methods can be adopted alone or in combination. Specifically, when a PVA-based resin membrane 10 is passed through rolls 31, 31, 32, 32 having different peripheral speeds so as to be stretched (free-end stretching) in a conveying direction (MD) as illustrated in FIG. 3, such an embodiment that the stretching is combined with stretching in a direction (TD) perpendicular to the conveying direction is given. Hereinafter, a preferred embodiment is specifically described.

In the preferred embodiment, the polarizing membrane of the present invention is produced by shrinking the PVA-based resin membrane in a first direction and stretching the membrane in a second direction. According to such production method, the Nz coefficient can be favorably satisfied.

The first direction is the conveying direction (MD) of the PVA-based resin membrane in one embodiment. The conveying direction is preferably the lengthwise direction of the lengthy PVA-based resin membrane, and can comprehend directions at −5° to +5° counterclockwise from the lengthwise direction of the PVA-based resin membrane. In another embodiment, the first direction is the direction (TD) perpendicular to the conveying direction. The direction perpendicular to the conveying direction is preferably the widthwise direction of the lengthy PVA-based resin membrane, and can comprehend directions at 85° to 95° counterclockwise from the lengthwise direction of the PVA-based resin membrane. It should be noted that the term "perpendicular" as used herein comprehends the case where the directions are substantially perpendicular to each other. Here, the term "substantially perpendicular" comprehends the case where an angle between the directions is 90°±5.0°, and the angle is preferably 90°±3.0°, more preferably 90°±1.0°.

The shrinkage may be performed simultaneously with the stretching, or may be performed at any other timing. In addition, the order of the shrinkage and the stretching is not limited, and the shrinkage may be performed in one stage, or may be performed in a plurality of stages. In one embodiment, the PVA-based resin membrane is preferably shrunk in the first direction while being stretched in the second direction. In another embodiment, the PVA-based resin membrane is preferably shrunk in the first direction before being stretched in the second direction.

In this embodiment, the Nz coefficient can be favorably satisfied by adjusting, for example, the shrinkage percentage of the PVA-based resin membrane. The shrinkage percentage in the first direction of the PVA-based resin membrane is preferably 40% or less, more preferably 35% or less, particularly preferably 20% or less. This is because excellent durability can be achieved. Meanwhile, the shrinkage percentage is preferably 5% or more. When the shrinkage percentage falls short of 5%, sufficient optical characteristics may not be obtained.

The second direction can be set to any appropriate direction depending on a desired polarizing membrane. The second direction and the first direction are preferably perpendicular to each other. Specifically, when the first direction is the conveying direction (MD) of the PVA-based resin membrane, the second direction is preferably the direction (TD) perpendicular to the conveying direction. When the first direction is the direction (TD) perpendicular to the conveying direction, the second direction is preferably the conveying direction (MD). It should be noted that the second direction is substantially the absorption axis direction of the polarizing membrane to be obtained.

The stretching of the PVA-based resin membrane may be performed in one stage, or may be performed in a plurality of stages. When the stretching is performed in a plurality of stages, the stretching ratio of the PVA-based resin membrane to be described later is the product of the stretching ratios in the respective stages. In addition, a stretching mode in the step is not particularly limited, and may be a midair stretching (dry stretching) mode, or may be an underwater stretching (wet stretching) mode.

The stretching temperature can be set to any appropriate value depending on, for example, a stretching mode and a stretching object. For example, when the laminate of the thermoplastic resin substrate and the PVA-based resin layer is stretched according to the midair stretching mode, the stretching temperature can be set to any appropriate value depending on, for example, the formation material for the thermoplastic resin substrate. The stretching temperature is representatively equal to or more than the glass transition temperature (Tg) of the thermoplastic resin substrate, and is preferably more than the glass transition temperature (Tg) of the thermoplastic resin substrate by 10° C. or more, more preferably equal to or more than Tg+15° C. Meanwhile, the stretching temperature is preferably 170° C. or less. Performing the stretching at such temperature can suppress rapid progress of the crystallization of the PVA-based resin and hence can suppress a trouble due to the crystallization (such as the rupture of the PVA-based resin membrane at the time of its stretching).

When the PVA-based resin film is stretched according to the midair stretching mode, the stretching temperature is representatively 70° C. to 130° C., preferably 80° C. to 120° C.

When the underwater stretching mode is adopted, the stretching temperature is preferably 85° C. or less, more preferably 30° C. to 65° C. When the temperature exceeds 85° C., a trouble such as the elution of iodine which the PVA-based resin is caused to adsorb or the elution of the PVA-based resin may occur, and hence the optical characteristics of the polarizing membrane to be obtained may reduce.

When the underwater stretching mode is adopted, the PVA-based resin membrane is preferably stretched in an aqueous solution of boric acid. The use of the aqueous solution of boric acid can impart, to the PVA-based resin membrane, rigidity enough to withstand a tension to be applied at the time of its stretching and such water resistance that the membrane does not dissolve in water. Specifically, boric acid can produce a tetrahydroxyboric acid anion in the aqueous solution to cross-link with the PVA-based resin through a hydrogen bond, and hence can impart the rigidity and the water resistance. As a result, for example, the realization of an additionally high polarizing membrane contrast ratio can be achieved. The aqueous solution of boric acid is obtained by dissolving boric acid and/or a borate in water as a solvent. The concentration of boric acid is typically 1 part by weight to 10 parts by weight with respect to 100 parts by weight of water. The time period for which the PVA-based resin membrane is immersed in a stretching bath is preferably about 15 seconds to 5 minutes.

A stretching ratio in the second direction is preferably 4.0 times or more with respect to the original length of the PVA-based resin membrane. Shrinking in the first direction enables stretching at such high ratio and hence can provide a polarizing membrane having excellent optical characteristics. Meanwhile, the stretching ratio is preferably 6.0 times or less, more preferably 5.5 times or less.

Figure 2:
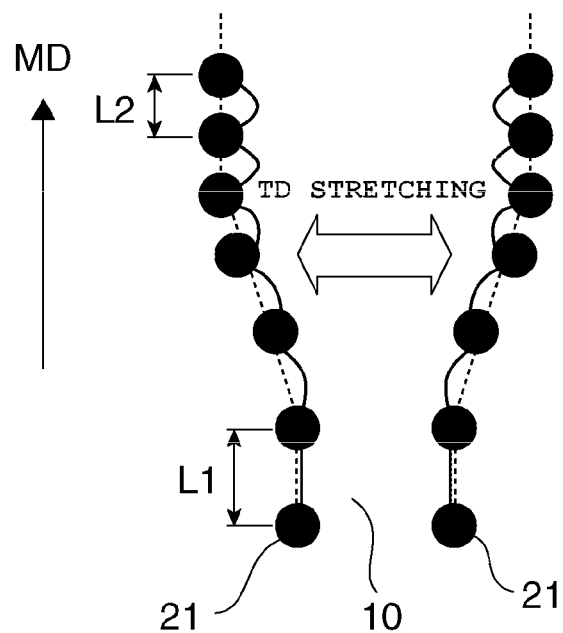
FIG. 2 is a schematic view illustrating a specific example of a method of producing a polarizing membrane.

FIG. 2 illustrates a specific example of a shrinking-stretching step. In the illustrated example, while the PVA-based resin membrane 10 is conveyed in its lengthwise direction, the PVA-based resin membrane 10 is shrunk in the conveying direction (MD) and stretched in the direction (TD) perpendicular to the conveying direction with a simultaneous biaxial stretching machine. Specifically, the PVA-based resin membrane 10 held with left and right clips 21, 21 at a tenter inlet is stretched in the TD while being conveyed at a predetermined speed. In the illustrated example, the shrinkage of the PVA-based resin membrane is controlled by, for example, gradually reducing the moving speed of each clip in the conveying direction to shorten a distance between the clips. The shrinkage percentage can be controlled by adjusting a distance L1 between the clips at the tenter inlet in the conveying direction and a distance L2 between the clips at a tenter outlet in the conveying direction (the moving speed of each clip in the conveying direction). Specifically, a desired shrinkage percentage can be achieved by setting the speed of each clip at the tenter outlet to the product of its speed at the tenter inlet and the shrinkage percentage. It should be noted that a broken line in FIG. 2 illustrates the rail of the clip 21.

When the PVA-based resin membrane is shrunk and stretched with the simultaneous biaxial stretching machine as illustrated in FIG. 2, the PVA-based resin membrane is preferably shrunk before being stretched. Specifically, the distance between the clips in the conveying direction is shortened before the membrane is stretched in the TD. According to such embodiment, a force is applied to the PVA-based resin membrane upon stretching in an additionally uniform fashion, and hence a portion held with each clip can be prevented from being selectively stretched. Specifically, a portion not held with any clip can be prevented from curving inward at an edge side of the PVA-based resin membrane. As a result, uniformity can be improved.

B-3. Other Treatments

A treatment for producing the polarizing membrane except the stretching treatment is, for example, a dyeing treatment, an insolubilizing treatment, a cross-linking treatment, a washing treatment, or a drying treatment. Any such treatment can be performed at any appropriate timing.

The dyeing treatment is representatively a treatment involving dyeing the PVA-based resin membrane with the dichromatic substance. The treatment is preferably performed by causing the PVA-based resin membrane to adsorb the dichromatic substance. A method for the adsorption is, for example, a method involving immersing the PVA-based resin membrane in a dyeing liquid containing the dichromatic substance, a method involving applying the dyeing liquid to the PVA-based resin membrane, or a method involving spraying the PVA-based resin membrane with the dyeing liquid. Of those, the method involving immersing the PVA-based resin membrane in the dyeing liquid containing the dichromatic substance is preferred. This is because the dichromatic substance can favorably adsorb to the membrane.

When iodine is used as the dichromatic substance, the dyeing liquid is preferably an aqueous solution of iodine. The compounding amount of iodine is preferably 0.04 part by weight to 5.0 parts by weight with respect to 100 parts by weight of water. The aqueous solution of iodine is preferably compounded with an iodide salt in order that the solubility of iodine in water may be improved. Examples of the iodide salt include potassium iodide, lithium iodide, sodium iodide, zinc iodide, aluminum iodide, lead iodide, copper iodide, barium iodide, calcium iodide, tin iodide, and titanium iodide. Of those, potassium iodide and sodium iodide are preferred.

The compounding amount of the iodide salt is preferably 0.3 part by weight to 15 parts by weight with respect to 100 parts by weight of water.

The liquid temperature of the dyeing liquid at the time of the dyeing is preferably 20° C. to 40° C. When the PVA-based resin membrane is immersed in the dyeing liquid, the time period for which the membrane is immersed is preferably 5 seconds to 300 seconds. Under such conditions, the PVA-based resin membrane can be sufficiently caused to adsorb the dichromatic substance.

The insolubilizing treatment and the cross-linking treatment are representatively performed by immersing the PVA-based resin membrane in an aqueous solution of boric acid. The washing treatment is representatively performed by immersing the PVA-based resin membrane in an aqueous solution of potassium iodide. A drying temperature in the drying treatment is preferably 30° C. to 100° C.

Hereinafter, the present invention is specifically described by way of examples. However, the present invention is not limited by these examples. It should be noted that a method of measuring the thickness of an obtained polarizing membrane is as described below.

(Thickness of Polarizing Membrane)

The thickness of a PVA-based resin layer or a PVA-based resin film was measured with a dial gauge (manufactured by PEACOCK, product name "DG-205 type pds-2") after a dyeing treatment to be described later.

EXAMPLE 1

<Production of Laminate>
(Thermoplastic Resin Substrate)

A lengthy cycloolefin-based resin film (manufactured by JSR, trade name "ARTON") having a thickness of 200 μm and a Tg of 123° C. was used as a thermoplastic resin substrate.
(Preparation of Application Liquid)

A polyvinyl alcohol (PVA) resin (manufactured by The Nippon Synthetic Chemical Industry Co., Ltd., trade name "GOHSENOL (registered trademark) NH-18") having a polymerization degree of 1,800 and a saponification degree of 98 to 99% was dissolved in water. Thus, a polyvinyl alcohol aqueous solution having a concentration of 7 wt % was prepared.
(Formation of PVA-Based Resin Layer)

The application liquid was applied to one surface of the thermoplastic resin substrate subjected to a stretching treatment with a die coater (die coating method). After that, the resultant was dried at 100° C. for 180 seconds so that a PVA-based resin layer having a thickness of 9 μm was formed. Thus, a laminate was produced.
<Shrinking-Stretching Treatment>

The resultant laminate was shrunk at 140° C. in the first direction (MD) by 40%, and at the same time, was subjected to dry stretching in the second direction (TD) at a ratio of 5.0 times with a simultaneous biaxial stretching machine as illustrated in FIG. 2.
<Dyeing Treatment>

Next, the laminate was immersed in an aqueous solution of iodine at 25° C. (iodine concentration: 0.5 wt %, potassium iodide concentration: 10 wt %) for 30 seconds.
<Cross-Linking Treatment>

After dyeing, the laminate was immersed in an aqueous solution of boric acid at 60° C. (boric acid concentration: 5 wt %, potassium iodide concentration: 5 wt %) for 60 seconds.
<Washing Treatment>

After cross-linking treatment, the laminate was immersed in an aqueous solution of potassium iodide at 25° C. (potassium iodide concentration: 5 wt %) for 5 seconds.

Thus, a polarizing membrane having a thickness of 3 μm was produced on the thermoplastic resin substrate.

A protective film (thickness: 80 μm, manufactured by Fuji film Corporation, trade name "TD8OUL") was attached to the polarizing membrane side of the laminate through a vinyl alcohol-based adhesive. Next, the thermoplastic resin substrate was released from the polarizing membrane, and then a protective film (thickness: 40 μm, manufactured by Toyo Kohan Co., Ltd., trade name "Fine Cast") was attached to the released surface through a vinyl alcohol-based adhesive. Thus, a polarizing film was produced.

EXAMPLE 2

A polarizing film was produced in the same manner as in Example 1 except that: a PVA-based resin layer having a thickness of 10 μm was formed upon production of the laminate; the shrinkage percentage in the first direction in the shrinking-stretching treatment was set to 35%; and the concentration of iodine at the time of the dyeing treatment was set to 0.45 wt %. It should be noted that the thickness of the resultant polarizing membrane was 3 μm.

EXAMPLE 3

A polarizing film was produced in the same manner as in Example 1 except that: a PVA-based resin layer having a thickness of 13 μm was formed upon production of the laminate; the shrinkage percentage in the first direction in the shrinking-stretching treatment was set to 15%; and the concentration of iodine at the time of the dyeing treatment was set to 0.35 wt %. It should be noted that the thickness of the resultant polarizing membrane was 3 μm.

EXAMPLE 4

A polarizing film was produced in the same manner as in Example 1 except that: a PVA-based resin film (manufactured by KURARAY CO., LTD., trade name "PS-7500") having a thickness of 75 μm was used instead of the laminate; the temperature in the shrinking-stretching treatment and the shrinkage percentage in the first direction in the treatment were set to 110° C. and 20%, respectively; and the concentration of iodine at the time of the dyeing treatment was set to 0.2 wt %. It should be noted that the thickness of the resultant polarizing membrane was 19 μm.

EXAMPLE 5

A PVA-based resin film (manufactured by KURARAY CO., LTD., trade name "PS-7500") having a thickness of 75 μm was subjected to wet stretching (shrinkage percentage in the first direction (TD): 20%, stretching ratio in the second direction (MD): 5.0 times) between rolls having a ratio "L (inter-stretching distance)/W (film width immediately before stretching)" of 0.1 while being subjected to the dyeing, cross-linking, and washing treatments. Thus, a polarizing membrane having a thickness of 19 μm was produced. A polarizing film was produced by attaching the same protective films as those of Example 1 to the polarizing membrane. It should be noted that conditions for the dyeing, cross-linking, and washing treatments were identical to those of Example 1 except that the concentration of iodine at the time of the dyeing treatment was set to 0.05 wt %.

COMPARATIVE EXAMPLE 1

A polarizing film was produced in the same manner as in Example 1 except that: a PVA-based resin film (manufactured by KURARAY CO., LTD., trade name "PE-6000") having a thickness of 60 μm was used instead of the laminate; the temperature in the shrinking-stretching treatment, the shrinkage percentage in the first direction in the treatment, and the stretching ratio in the second direction in the treatment were set to 110° C., 48%, and 6.0 times, respectively; and the concentration of iodine at the time of the dyeing treatment was set to 0.25 wt %. It should be noted that the thickness of the resultant polarizing membrane was 19 μm.

COMPARATIVE EXAMPLE 2

A polarizing film was produced in the same manner as in Example 1 except that: a PVA-based resin layer having a thickness of 7 μm was formed upon production of the laminate; and the shrinkage percentage in the first direction in the shrinking-stretching treatment was set to 55%. It should be noted that the thickness of the resultant polarizing membrane was 3 µm.

COMPARATIVE EXAMPLE 3

A polarizing film was produced in the same manner as in Example 1 except that: a PVA-based resin layer having a thickness of 15 µm was formed upon production of the laminate; no shrinkage was performed in the first direction in the shrinking-stretching treatment (the shrinkage percentage was set to 0%); and the concentration of iodine at the time of the dyeing treatment was set to 0.3 wt %. It should be noted that the thickness of the resultant polarizing membrane was 3 µm.

The polarizing films obtained in the respective examples and comparative examples were evaluated. Evaluation methods and evaluation criteria are as described below. Table 1 shows the results of the measurement.

1. Nz Coefficient of PVA-Based Resin Membrane

The retardations of a polarizing membrane were measured with a retardation-measuring apparatus (manufactured by Oji Scientific Instruments, trade name "KOBRA 31X100/IR") for light having a wavelength ($\lambda$) at 23° C. of any one of 848.2 nm, 903.4 nm, 954.7 nm, 1,000.9 nm, 1,045.9 nm, and 1,089.0 nm. Specifically, a front retardation (Re) and a retardation (R30) measured by tilting the membrane by 30° with its absorption axis as a tilt axis were measured at each wavelength, and then its Nz coefficient was determined from the absence of the occurrence of a crack after 200 cycles was observed. It should be noted that a time period needed for 1 cycle was set to 1 hour.

(Calculation Equation for Crack Occurrence Ratio)

Crack occurrence ratio (%)=(number of samples in which cracks occur)/10×100

(Evaluation Criteria)
⊚: 0% to 10%
○: 20% to 30%
Δ: 40% to 50%
×: 60% or more

3. Polarization Degree

The single axis transmittance (Ts), parallel transmittance (Tp), and crossed transmittance (Tc) of a polarizing membrane (polarizing film) were measured with a spectrophotometer (manufactured by MURAKAMI COLOR RESEARCH LABORATORY, product name "Dot-41"), and then its polarization degree (P) at a single axis transmittance of 40% was determined from the following equation. It should be noted that those transmittances are Y-values obtained by subjecting values measured with the two-degree field of view (C light source) of JIS Z 8701 to color correction.

Polarization degree $(P)=\{(Tp-Tc)/(Tp+Tc)\}^{1/2} \times 100$ (Evaluation criteria)
⊚: 99.95% or more
○: 99.93% or more
×: Less than 99.9%

TABLE 1

| | Thickness of PVA-based resin membrane | Stretching Mode | Stretching Ratio | Shrinkage percentage | Nz coefficient | Thickness of polarizing membrane | Durability | Polarization degree |
|---|---|---|---|---|---|---|---|---|
| Example 1 | 9 µm | Dry | 5.0 times | 40% | 1.10 | 3 µm | ○ | ⊚ |
| Example 2 | 10 µm | Dry | 5.0 times | 35% | 1.20 | 3 µm | ⊚ | ⊚ |
| Example 3 | 13 µm | Dry | 5.0 times | 15% | 1.40 | 3 µm | ⊚ | ○ |
| Example 4 | 75 µm | Dry | 5.0 times | 20% | 1.35 | 19 µm | ○ | ○ |
| Example 5 | 75 µm | Wet | 5.0 times | 20% | 1.35 | 19 µm | ○ | ○ |
| Comparative Example 1 | 60 µm | Dry | 6.0 times | 48% | 1.05 | 19 µm | X | ⊚ |
| Comparative Example 2 | 7 µm | Dry | 5.0 times | 55% | 1.05 | 3 µm | Δ | ⊚ |
| Comparative Example 3 | 15 µm | Dry | 5.0 times | 0% | 1.60 | 3 µm | ⊚ | X | resultant retardation values with a three-dimensional refractive index calculation software (N-Calc. Ver. 1.23). It should be noted that the measurement was performed such a number of times that a coefficient of determination concerning the approximate curve became 0.9 or more.

2. Durability

A test piece (1,150 mm×650 mm) having a short side in the second direction (TD) was cut out of the resultant polarizing film. Ten test pieces were prepared for each of the examples and the comparative examples. The test pieces were attached to a glass plate with a pressure-sensitive adhesive. The resultant was left to stand in an oven whose environmental temperature abruptly changed, and then the polarizing film was examined for its crack occurrence ratio after the standing. Details about the change of the environmental temperature, a calculation equation for the crack occurrence ratio, and evaluation criteria are as described below.

(Details About Change of Environmental Temperature)

A cycle "normal temperature→85° C.→−45° C.→normal temperature" was defined as 1 cycle, and the presence or The polarizing film of each of the examples brought together excellent durability and excellent optical characteristics. On the other hand, each of Comparative Examples 1 and 2 had low durability, though the comparative examples had high polarization degrees. Comparative Example 1 in which the thickness of the polarizing membrane was large had particularly low durability. Comparative Example 3 had a low polarization degree, though the comparative example was excellent in durability.

Each of the polarizing membrane and the polarizing film of the present invention is suitably used for liquid crystal panels of, for example, liquid crystal televisions, liquid crystal displays, cellular phones, digital cameras, video cameras, portable game machines, car navigation systems, copying machines, printers, facsimile machines, clockes, and microwave ovens.

Many other modifications will be apparent to and be readily practiced by those skilled in the art without departing from the scope and spirit of the invention. It should therefore be understood that the scope of the appended claims is not intended to be limited by the details of the description but should rather be broadly construed.

What is claimed is:

1. A polarizing membrane, comprising a polyvinyl alcohol-based resin membrane containing a dichromatic substance, wherein the polyvinyl alcohol-based resin membrane has an Nz coefficient of 1.10 or more and 1.50 or less.

2. The polarizing membrane according to claim 1, wherein the polarizing membrane has a polarization degree at a single axis transmittance of 40% of 99.9% or more.

3. The polarizing membrane according to claim 1, wherein the polarizing membrane has a thickness of less than 10 μm.

4. The polarizing membrane according to claim 1, wherein the polarizing membrane has a thickness of 1 μm or more.

5. The polarizing membrane according to claim 1, wherein the polarizing membrane is obtained by shrinking one of a polyvinyl alcohol-based resin film and a polyvinyl alcohol-based resin layer formed on a thermoplastic resin substrate in a first direction, and stretching one of the film and the layer in a second direction.

6. The polarizing membrane according to claim 5, wherein a shrinkage percentage in the first direction is 5% or more and 40% or less.

7. The polarizing membrane according to claim 5, wherein a stretching ratio in the second direction is 4.0 times or more.

8. A polarizing film, comprising:
   the polarizing membrane according to claim 1; and
   a protective film laminated on at least one side of the polarizing membrane.

9. The polarizing membrane according to claim 7, wherein a stretching ratio in the second direction is 6.0 times or less.

* * * * *